United States Patent
Lowery

(10) Patent No.: US 10,725,824 B2
(45) Date of Patent: Jul. 28, 2020

(54) THREAD ASSOCIATED MEMORY ALLOCATION AND MEMORY ARCHITECTURE AWARE ALLOCATION

(71) Applicant: RAMBUS, INC., Sunnyvale, CA (US)

(72) Inventor: Keith Lowery, Garland, TX (US)

(73) Assignee: Rambus Inc., San Jose, CA (US)

( * ) Notice: Subject to any disclaimer, the term of this patent is extended or adjusted under 35 U.S.C. 154(b) by 268 days.

(21) Appl. No.: 15/743,635

(22) PCT Filed: Jul. 5, 2016

(86) PCT No.: PCT/US2016/040970
§ 371 (c)(1),
(2) Date: Jan. 10, 2018

(87) PCT Pub. No.: WO2017/011223
PCT Pub. Date: Jan. 19, 2017

(65) Prior Publication Data
US 2018/0203734 A1    Jul. 19, 2018

Related U.S. Application Data

(60) Provisional application No. 62/191,219, filed on Jul. 10, 2015.

(51) Int. Cl.
*G06F 9/50* (2006.01)
*G06F 8/41* (2018.01)
(Continued)

(52) U.S. Cl.
CPC ........... *G06F 9/5016* (2013.01); *G06F 8/453* (2013.01); *G06F 9/3004* (2013.01);
(Continued)

(58) Field of Classification Search
CPC ...... G06F 8/45–451; G06F 8/453; G06F 8/50; G06F 8/5011; G06F 8/5061;
(Continued)

(56) References Cited

U.S. PATENT DOCUMENTS

| 5,784,697 A | 7/1998 | Funk et al. |
| 6,058,460 A | 5/2000 | Nakhimovsky |

(Continued)

OTHER PUBLICATIONS

A. Wellings and M. Schoeberl, "Thread-Local Scope Caching for Real-time Java," 2009 IEEE International Symposium on Object/Component/Service-Oriented Real-Time Distributed Computing, Tokyo, 2009, pp. 275-282. (Year: 2009).*

(Continued)

*Primary Examiner* — Andrew M. Lyons
(74) *Attorney, Agent, or Firm* — Lowenstein Sandler LLP

(57) ABSTRACT

A method and system for thread aware, class aware, and topology aware memory allocations. Embodiments include a compiler configured to generate compiled code (e.g., for a runtime) that when executed allocates memory on a per class per thread basis that is system topology (e.g., for non-uniform memory architecture (NUMA)) aware. Embodiments can further include an executable configured to allocate a respective memory pool during runtime for each instance of a class for each thread. The memory pools are local to a respective processor, core, etc., where each thread executes.

27 Claims, 7 Drawing Sheets

(51) Int. Cl.
*G06F 9/30* (2018.01)
*G06F 9/38* (2018.01)
*G06F 12/02* (2006.01)

(52) U.S. Cl.
CPC .............. *G06F 9/3889* (2013.01); *G06F 9/50* (2013.01); *G06F 12/023* (2013.01); *G06F 2209/502* (2013.01); *G06F 2212/2542* (2013.01); *Y02D 10/22* (2018.01)

(58) Field of Classification Search
CPC ........ G06F 9/3004; G06F 9/3889; G06F 9/50; G06F 9/5016; G06F 12/00; G06F 12/02; G06F 12/0223; G06F 12/023; G06F 2209/50; G06F 2209/5011; G06F 2209/5012; G06F 2209/5014; G06F 2209/5018; G06F 2209/502; G06F 2212/1016; G06F 2212/1024; G06F 2212/20; G06F 2212/205; G06F 2212/22; G06F 2212/225; G06F 2212/25; G06F 2212/251; G06F 2212/2515; G06F 2212/254; G06F 2212/2542; Y02D 10/22
USPC ................ 717/106, 108, 140, 143, 151, 152
See application file for complete search history.

(56) References Cited

U.S. PATENT DOCUMENTS

| | | | |
|---|---|---|---|
| 6,167,437 A * | 12/2000 | Stevens | G06F 12/08 709/214 |
| 6,275,916 B1 * | 8/2001 | Weldon, Jr. | G06F 9/4488 711/170 |
| 6,785,888 B1 * | 8/2004 | McKenney | G06F 9/5016 709/226 |
| 7,076,511 B1 * | 7/2006 | Lari | G06F 12/023 |
| 7,526,515 B2 * | 4/2009 | Broussard | G06F 9/4856 |
| 7,783,852 B2 | 8/2010 | Lahiri et al. | |
| 8,245,008 B2 | 8/2012 | Kaminski et al. | |
| 8,635,626 B2 | 1/2014 | Jula et al. | |
| 9,665,533 B2 * | 5/2017 | Lowery | G06F 3/0619 |
| 2006/0206489 A1 * | 9/2006 | Finnie | G06F 9/5016 |
| 2009/0228537 A1 * | 9/2009 | Branda | G06F 12/0261 |
| 2010/0211756 A1 * | 8/2010 | Kaminski | G06F 12/023 711/172 |
| 2010/0287216 A1 * | 11/2010 | Ylonen | G06F 12/0253 707/813 |
| 2011/0082892 A1 * | 4/2011 | Ogasawara | G06F 9/526 707/819 |
| 2011/0264870 A1 * | 10/2011 | Ylonen | G06F 12/0261 711/154 |
| 2011/0314238 A1 * | 12/2011 | Finkler | G06F 9/544 711/162 |
| 2012/0102500 A1 * | 4/2012 | Waddington | G06F 9/5061 718/104 |
| 2012/0102501 A1 * | 4/2012 | Waddington | G06F 9/5061 718/105 |
| 2012/0159124 A1 * | 6/2012 | Hu | G06F 12/0842 712/205 |
| 2012/0180068 A1 * | 7/2012 | Wein | G06F 9/4881 718/106 |
| 2012/0254266 A1 * | 10/2012 | Printezis | G06F 12/0276 707/818 |
| 2012/0254267 A1 * | 10/2012 | Printezis | G06F 12/0269 707/818 |
| 2012/0317371 A1 * | 12/2012 | Gounares | G06F 12/0813 711/147 |
| 2012/0317389 A1 * | 12/2012 | Gounares | G06F 11/3466 711/170 |
| 2013/0263116 A1 * | 10/2013 | Haupt | G06F 9/5016 718/1 |
| 2014/0115291 A1 * | 4/2014 | Caspole | G06F 12/0269 711/166 |
| 2015/0205646 A1 * | 7/2015 | Singh | G06F 9/526 718/106 |
| 2016/0019150 A1 * | 1/2016 | Otawa | G06F 12/0815 711/141 |
| 2016/0034587 A1 * | 2/2016 | Barber | G06F 16/24532 707/754 |
| 2016/0092273 A1 * | 3/2016 | Reed | G06F 9/465 718/101 |
| 2016/0224252 A1 * | 8/2016 | Hutsell | G06F 12/0802 |
| 2016/0371194 A1 * | 12/2016 | Wagle | G06F 9/5016 |
| 2016/0378388 A1 * | 12/2016 | Hegde | G06F 3/0652 711/166 |
| 2017/0068465 A1 * | 3/2017 | Schreter | G06F 16/22 |
| 2019/0213043 A1 * | 7/2019 | Ogasawara | G06F 9/3009 |

OTHER PUBLICATIONS

W. Hagen, M. Plauth, F. Eberhardt, F. Feinbube and A. Polze, "PGASUS: A Framework for C++ Application Development on NUMA Architectures," 2016 Fourth International Symposium on Computing and Networking (CANDAR), Hiroshima, 2016, pp. 368-374. (Year: 2016).*
A. Lenharth and K. Pingali, "Scaling Runtimes for Irregular Algorithms to Large-Scale NUMA Systems," in Computer, vol. 48, No. 8, pp. 35-44, Aug. 2015. (Year: 2015).*
Notification Concerning Transmiftal of International Preliminary Report on Patentability dated Jan. 25, 2018 re: Int'l Appln. No. PCT/US16/040970. 10 Pages.
Notification of Transmittal of the International Search Report and the Written Opinion of the International Searching Authority, or Declaration dated Sep. 14, 2016 re: Int'l Appln. No. PCT/US16/040970. 16 Pages.

\* cited by examiner

400

THREAD ASSOCIATED MEMORY ALLOCATION AND MEMORY ARCHITECTURE AWARE ALLOCATION

BACKGROUND

Increasingly, larger amounts of information are being stored and processed by computing systems. At a base level, these computing systems are configured with one or more processors, each controlling access to corresponding memory. However, efficient use of resources with such large amounts of information can be challenging.

BRIEF DESCRIPTION OF THE DRAWINGS

Further aspects of the present disclosure will become apparent from the following description which is given by way of example only and with reference to the accompanying drawings in which.

DETAILED DESCRIPTION

Figure 1:
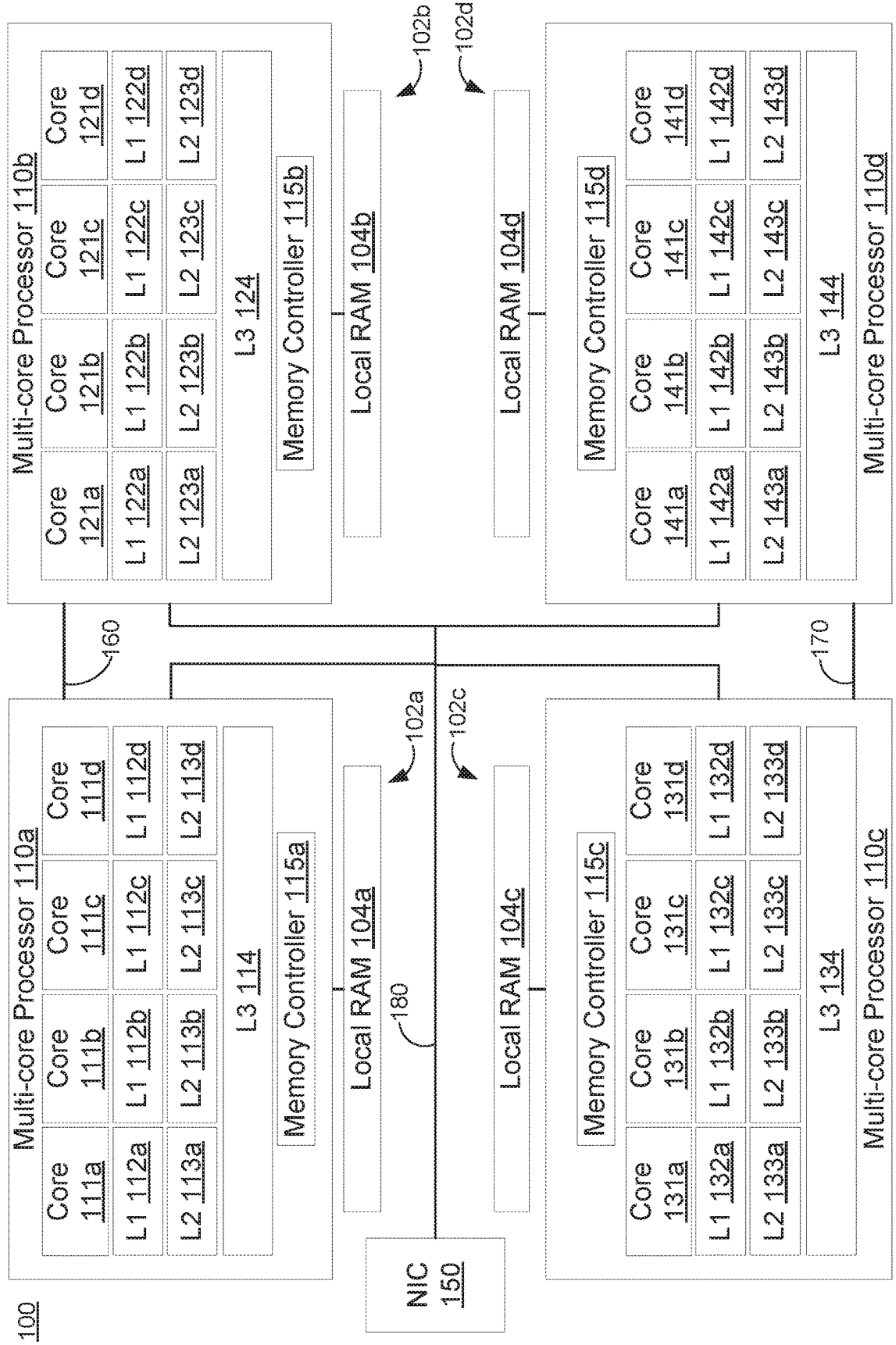
FIG. 1 shows a block diagram of a system with a non-uniform memory architecture (NUMA), in accordance with various embodiments.

Reference will now be made in detail to the various embodiments of the present disclosure, examples of which are illustrated in the accompanying drawings. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The limits of frequency scaling as used for improving single-thread performance in central processing units (CPUs) have resulted in multiple cores being put into processors to allow more parallelism. The implications of this from a software perspective are significant because parallel programming is often challenging. This is due to the fact that parallel programming necessitates software developers reasoning about problems in ways that can be non-intuitive to human beings.

The complexity of symmetric multiprocessor (SMP) systems can require software developers reason, not only about parallel algorithms, but also about system-level bottlenecks that impact overall performance. As such, instead of being able to focus on programming domain specific problems, developers may have to consider system architectures in order to achieve maximum performance.

System-level memory architectures can have a significant impact on performance. Many CPUs include memory controllers on-die and there is a global address space for the CPUs. Motherboard topologies are such that memory performance varies depending on the proximity of a specific location to a specific core that is running code that is accessing the memory. Non-Uniform Memory Architectures (NUMAs) can have runtime characteristics that negatively impact application performance. For example, in one exemplary quad socket system with a random distribution of memory locations for an application's data, 75% of the memory references would be "far" references involving data traversals across the motherboard. In some cases, these quad socket systems are avoided because memory access patterns of dual socket systems perform better by having 50% far memory references as compared to the 75% far memory references. Because the reduction of far memory references can improve performance, developers can consider system topology and memory management when designing the thread architecture of an application in order to achieve improved performance out of SMP systems.

In contrast, the evolution of software development languages has, for decades, moved away from system topology awareness and toward abstractions thereby making reasoning about non-system problems easier. While object orientated languages and associated runtimes allow developers to reason about a complex problem, object oriented languages hide system and architectural complexities.

Embodiments discussed below can allow NUMA-aware memory allocations in object-oriented languages in a way that 1) preserves the simplicity for software developers while 2) transparently providing much improved NUMA memory allocation behavior of running applications. In some embodiments, a combination of C++ templates, C++ inheritance, thread-local storage, and NUMA-specific memory pools can be used to override the default "new" and "delete" operators (or similar operators for other programming languages). Developers can thereby be free to program in the way they are accustomed to while the "new" and "delete" operators access thread-specific lock-free memory pools for allocating instance data associated with new objects. Object allocation is fast due to the lock-free design and object allocation is NUMA-local to the node where the allocating thread executes. The lock-free design improves object allocation speed by removing the negative performance impacts of a lock based design. The object allocation is NUMA-local to the node where the thread requesting the object allocation executes thereby improving memory access performance (e.g., by reducing access latency).

With the memory allocation functionality in class templates, the compiler can generate distinct NUMA memory allocators for each unique class hierarchy that is based upon the underlying template.

Using the _thread storage class for certain memory variables can further ensure that each class-hierarchy allocator will advantageously allocate from a thread-specific pool of memory, thereby, in some circumstances, substantially eliminating the need for locking or concurrency control at runtime. The _thread storage class allows variable allocation such that there is an instance of the variable per thread. Table 1 shows exemplary C++ code for implementation of thread-specific lock-free memory pools for allocating instance data associated with new objects according to one embodiment.

TABLE 1

Exemplary code for thread specific and class specific memory allocation

```
template <typename T>
class fastobject {
public:
    fastobject( ) { }
    fastobject( ) { }
    void * operator new(size_t size)
    {
        ...
    }
    void operator delete(void *pObject)
    {
        ...
    }
    friend void fastobject_init<T>(void);
    friend void fastobject_make_key<T>(void);
protected:
    static pthread_key_t _key;
    static __thread pthread_once_t _once;
    static __thread struct mempool **_pools;
private:
};
```

The exemplary code of Table 1 combines templates, _thread specific memory pools, and overloading of the object allocation operators (e.g., new and delete). It is appreciated that any class used as a parameter to this template can cause the compiler to automatically generate variables in memory that are either global in scope for the generated class (e.g., _key) or global in scope per thread for the resulting compiler-generated class. The _thread-scoped variables receive per-thread initialization. The memory pools that are initialized to fulfill allocation requests can be explicitly initialized by the template implementation to be from the local NUMA node. This initialization generally occurs the first time a developer calls the "new" operator on a class derived from the class used to initialize the template. Each call to the "new" operator from a different thread can allocate objects from a thread-specific memory pool on the current NUMA node. Thus, a developer can advantageously use object-oriented abstractions of the language without regard to the system topology while achieving location-aware object allocation by default.

By using a combination of templates with _thread-scoped variables, a majority of the work for doing thread-specific allocations can be done by the compiler and runtime, while the actual allocation code can be simplified down to initializing the NUMA-specific memory pool and providing allocations therefrom. The _thread-scoped variable and object hierarchies derived from the templates can ensure that the "new" and "delete" operators occur in a thread-specific context.

The Figures illustrate example components used by various embodiments. Although specific components are disclosed in the Figures, it should be appreciated that such components are exemplary. That is, embodiments are well suited to having various other components or variations of the components recited in the Figures. It is appreciated that the components in the Figures may operate with other components than those presented, and that not all of the components of the Figures are required to achieve the goals of embodiments.

FIG. 1 shows a block diagram of a system with a non-uniform memory architecture (NUMA), in accordance with various embodiments. FIG. 1 depicts an exemplary NUMA system 100 having four multi core processors 110a-d with associated local memories 130a-d. The NUMA system 100 includes NUMA nodes 102a-d, local random access memories (RAMs) 104a-d, multi-core processors 110a-d, a Peripheral Component Interconnect (PCI) or PCI express (PCIe) bus 180, and a Network Interface Card (NIC) 150. The PCI bus 180 couples the NUMA nodes 102a-d, multi-core processors 110a-d, and the NIC 150.

The NUMA nodes 102a-d include RAMs 104a-d, multi-core processors 110a-d, which include memory controllers 115a-d. The local RAMs 104a-d are coupled to one or more processing elements (e.g., CPUs, cores, field-programmable gate arrays (FPGAs), etc.) in the multi-core processors 110a-d. The NUMA nodes 102a-b are coupled via a cross-node link 160 which allows communications between the NUMA nodes 102a-b. The NUMA nodes 102c-d are coupled via a cross-node link 170 which allows communications between the NUMA nodes 102c-d. The NUMA nodes 102a-d can further include processor or core local caches, a generic cache (e.g., shared cache), dynamic random access memory (DRAM), memory coupled to a system data bus, and other memory stores, etc.

The NIC 150 is configured for coupling the system 100 to a network thereby facilitating communications of system 100 with one or more other systems. The NIC 150 can include receive queues configured for receiving communications (e.g., data packets) from a network coupled to the NIC 150 and communications (e.g., data packets) from one or more processing elements in multi-core sockets 110a-d to communicate to the network.

The multi-core processor 110a includes cores 111a-d, level 1 (L1) caches 112a-d, level 2 (L2) caches 113a-d, a level 3 (L3) cache 114, and a memory controller 115a. The multi-core processor 110b includes cores 121a-d, L1 caches 122a-d, L2 caches 123a-d, a L3 cache 124, and a memory controller 115b. The multi-core processor 110c includes cores 131a-d, L1 caches 132a-d, L2 caches 133a-d, a L3 cache 134, and a memory controller 115c. The multi-core processor 110d includes cores 141a-d, L1 caches 142a-d, L2 caches 143a-d, a L3 cache 144, and a memory controller 115d. Each core of the multi-core processors 110a-d can have respective associated L1, L2, and L3 caches and local RAM. For example, the core 111a is associated with L1 cache 112a, L2 cache 113a, L3 cache 114, and the local RAM 104a. The multi-core processors 110a-d can each be coupled to local RAMs 130a-d and other components of system 100 via respective multi-core sockets (not shown).

The memory controllers 115a-d can control access to respective local RAMs 104a-d. The local RAMs 104a-d can function as a shared memory space for allocations of memory for one or more of multi-core processors 110a-d. As a result, memory allocations could occur that are not local to the processing elements. For example, a portion of local RAM 104a could be allocated to a process or thread executing on core 141a which will have increased latency because of being remote from core 141a.

Embodiments are configured to perform NUMA-aware or topology based allocations of memory thereby advantageously allocating memory that is local to where a process or thread executes. For example, memory allocations for processes or threads executing on cores 111a-d are allocated within local RAM 104a. As another example, memory allocations for processes or threads executing on cores 141a-d are allocated within local RAM 104d. The NUMA-aware or topology based allocations can further be within caches (e.g., L1, L2, and/or L3 caches). For example, memory allocations for processes or threads executing on core 111a of multi-core processor 110a can be from L1 cache 112a, L2 cache 113a, and/or L3 cache 114). The NUMA-aware allocations within the L1, L2, and/or L3 caches can be performed to the extent that a processor allows for cache manipulation and/or allocations at each cache level (e.g., based on the cache level granularity of cache manipulation the processor exposes to software).

Figure 2:
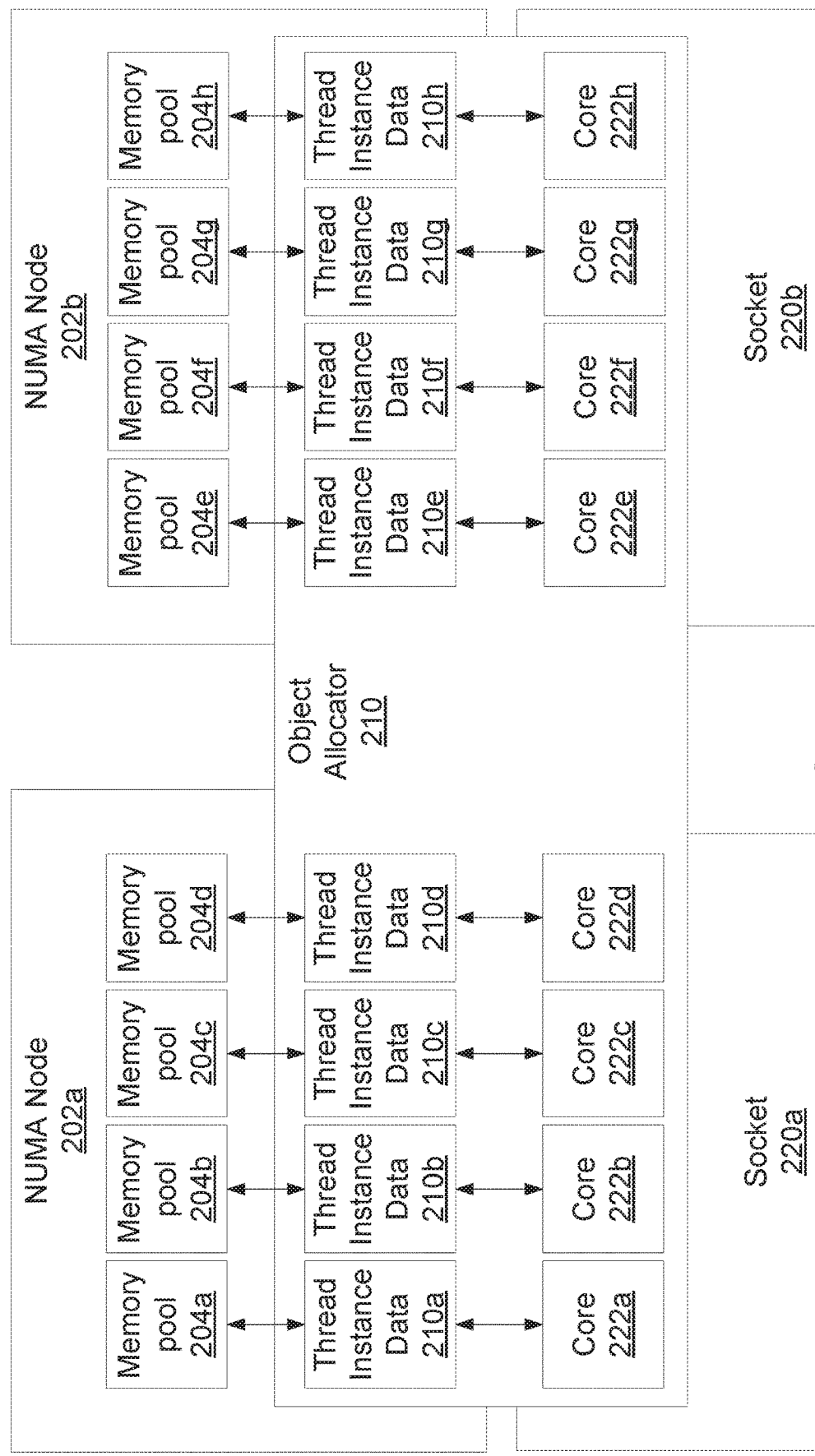
FIG. 2 shows a block diagram of system components and associated memory allocations, in accordance with various embodiments.

FIG. 2 shows a block diagram of system components and associated memory allocations, in accordance with various embodiments. FIG. 2 depicts how a multi-threaded application with an object allocator executing on a multi-socket system leverages thread-specific memory pools to satisfy allocation requests. The diagram 200 includes NUMA nodes 202a-b (e.g., NUMA nodes 102a-d), an object allocator 210, and sockets 220a-b.

The sockets 220a-b can support multiple processing elements, e.g., multi-core processors and/or multiple CPUs. For example, the multi-core processor 110a can be coupled with socket 220a and the multi-core processor 110b can be coupled in socket 220b. As shown, the socket 220a includes cores 222a-d and the socket 222b includes cores 222e-h. The cores 222a-h are configured to execute one or more processes which may have one or more respective threads.

The object allocator 210 is configured to allocate memory from within NUMA nodes 202a on a per-thread basis. The object allocator 210 allocates memory pools 204a-d corresponding to respective thread instance data 210a-d. The thread instance data 210a-d is associated with respective threads executing on cores 222a-d. The object allocator 210 allocates memory pools 204e-h corresponding to respective thread instance data 210e-h. The thread instance data 210e-h is associated with respective threads executing on cores 222e-h. The object allocator 210 thus allocates the memory pools on a per-instance (e.g., class instance), per-thread basis, and allocates to respective NUMA nodes based on the NUMA topology. Embodiments are thus able to perform class-based allocation of memory that are topology and micro architecture aware.

For example, the memory pools 204a-d can be allocated from a memory pool A that includes the local RAMs 104a-b and the L1-L3 caches of multi-core processors 110a-b. The memory pools 204e-h can be allocated from a memory pool B that can include the local RAMs 104c-d and the L1-L3 caches of multi-core processors 110c-d. The memory pool A (e.g., a memory pool class A 320a) can be used for memory allocations associated with a class A and the memory pool B (e.g., a memory pool class B 320b) can be used for memory allocations associated with a class B.

Figure 3:
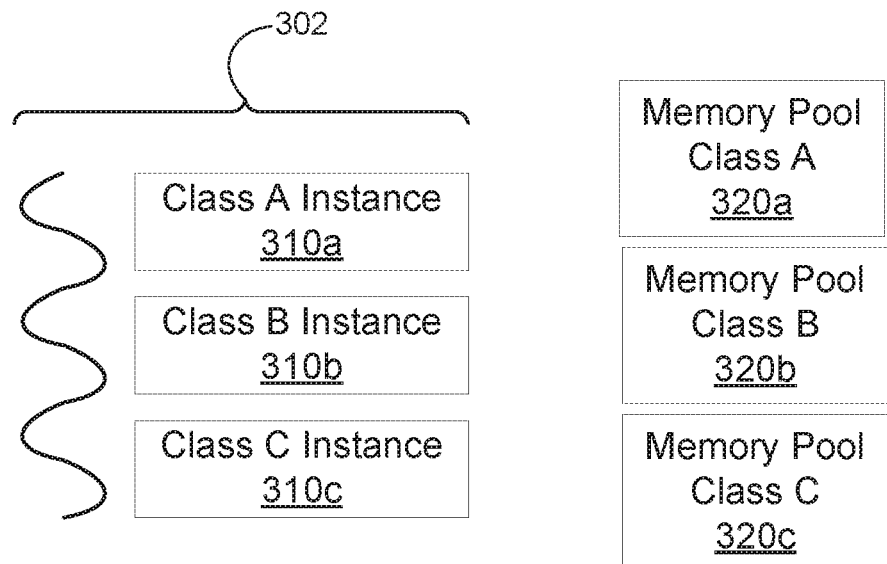
FIG. 3 shows a block diagram of components of a process and allocated memory portions, in accordance with various embodiments.
Figure 3:
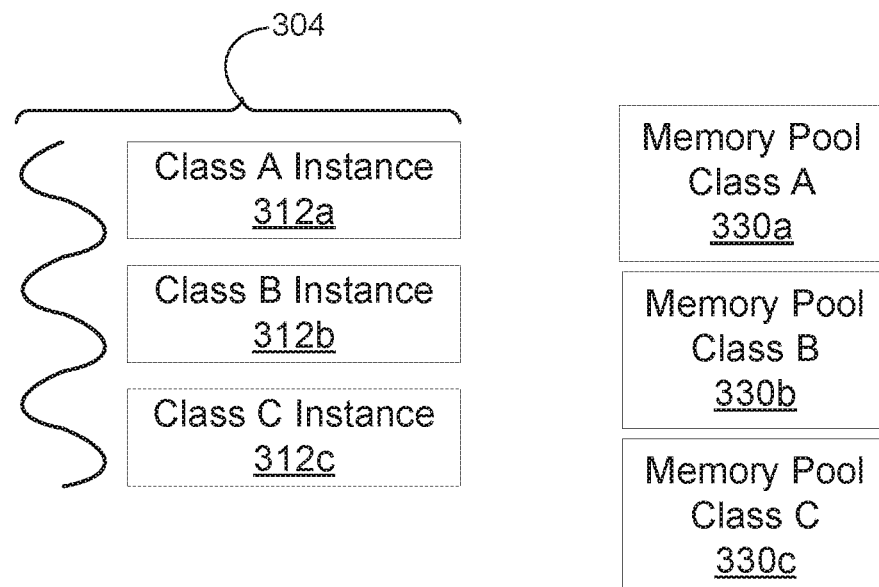

FIG. 3 shows a block diagram of components of a process and allocated memory portions, in accordance with various embodiments. FIG. 3 depicts exemplary threads of a process 300 with instances of classes and associated memory pools. For each thread there is a respective memory pool allocated for each respective class instance of each thread. The process 300 includes thread 302 and thread 304.

The thread 302 includes class A instance 310a which is associated with respective memory pool class A 320a. The thread 302 includes class B instance 310b which is associated with respective memory pool class B 320b. The thread 302 further includes class C instance 310c which is associated with respective memory pool class C 320c.

The thread 304 includes class A instance 312a which is associated with respective memory pool class A 330a. The thread 304 includes class B instance 312b which is associated with respective memory pool class B 330b. The thread 304 further includes class C instance 312c which is associated with respective memory pool class C 330c. The memory pools 320a-c and 330a-c can be allocated on a topology-aware basis, as described herein.

With any C++ class, a variable can be declared that is scoped to a thread. Each thread that references that class will receive a unique instance of that variable. That variable can further be initialized in a local NUMA memory pool. For the class hierarchy that derives from that class, each thread that references the class will have a respective memory pool. In some embodiments, the compiler generates code for the runtime to manage allocations and data structures. The compiler generates code that initializes a memory pool for each thread. It is appreciated that each allocation of an object that is performed out of that class uses a different memory pool based on the thread that is executing. The memory pools can be a portion of memory that is closest to the processor or core where the thread is running.

The use of templates in combination with the thread scope variables to get class specific variables allows a respective memory pool for each thread. A respective memory pool is allocated for each class instance for each thread. In other words, each class instance that is unique, for each thread, has a respective memory pool.

A compiler can be configured to use thread scoped variables combined with templates to have allocation of a thread specific memory pool initialized with the thread scoped variable in the memory pool object or a chunk of memory. The memory pool is further allocated in a location of memory that is in the nearest NUMA node to where the thread is executing. When the compiled program, executes the language, runtime performs the allocation of thread and class specific memory pools allocated based on the system topology. The compiler thus automatically generates code for allocation of thread and class specific memory pools that allocated based on system topology.

The memory pools are initialized locally based on system topology, e.g., the nearest NUMA node from a system topology standpoint. Thus, for a thread running on a processor requesting an allocation of memory for an object, it will have the memory allocated be local to the processor where the process is running.

In some embodiments, the thread specific memory pools can be used with non multi-socket systems where there are NUMA issues and where allocations out of a memory pool that are lock free are desired for, among other reasons, performance reasons. The lock free allocations avoid the negative performance impacts of locking, synchronizing, and coordination among threads.

Embodiments include an executable configured to allocate memory based on object oriented structures (e.g., one or more classes) and an executable configured to allocated memory based on topology. The allocations of memory based on system topology can increase performance, save time, and reduce energy consumption.

Figure 4:
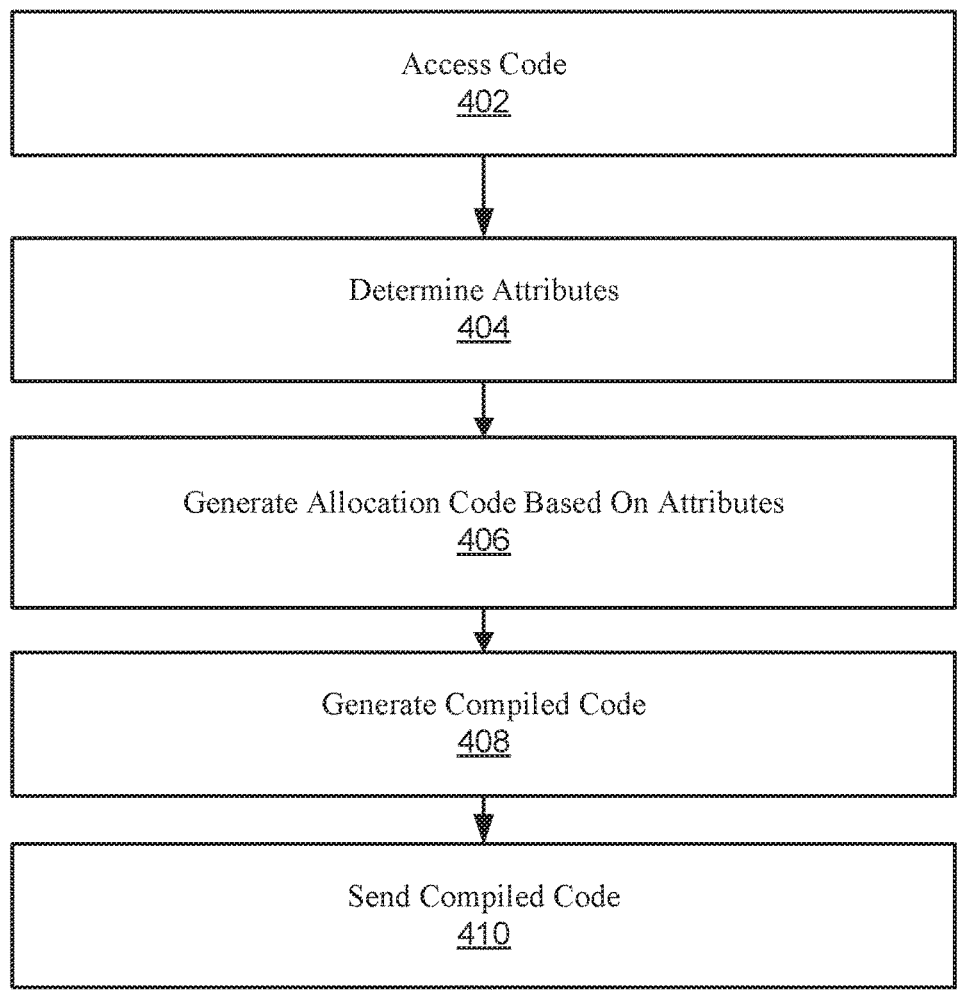
FIG. 4 shows a flowchart of an exemplary electronic component-controlled process for compiling code, in accordance with various embodiments.

FIG. 4 shows a flowchart of an exemplary electronic component-controlled process for compiling code, in accordance with various embodiments. FIG. 4 depicts a process 400 that is executed by a compiler in generating compiled code configured for per class and per thread topology (e.g., NUMA) aware allocations.

The generated code can be configured to allocate memory pools based on topology alone, class alone, or based on a combination of class and topology. The generated code can be configured to allocate first based on class to select a memory pool and then based on topology for a particular portion of the selected memory pool. For example, allocations for an instance of a class A of a process executing on the multi-core processor 110a may be made from a memory pool A which includes local RAMs 104a-b while allocations for an instance of a class B of a process executing on the multi-core processor 110*c* may be made from a memory pool B which includes local RAMs 104*c-d*. The specific locations of memory used for allocations within the memory pools, by the generated code, can be based on topology of the NUMA system. For example, a thread executing multi-core processor 110*a* would have memory allocations within the local RAM 104*a* selected instead of memory allocations within the local RAM 104*b* because the local RAM 104*a* is closer to the multi-core processor 110*a*. As another example, a thread executing on the core 111*a* would have memory locations within the L1 cache 112*a* selected instead of memory locations within the L1 cache 112*b* because of the proximity of the L1 cache 112*a* to the core 111*a*.

At block 402, code is accessed. The compiler can access the code from a data store or receive the code from a data source.

At block 404, attributes are determined. The attributes are configured to communicate to the runtime thread specific attributes for memory allocations. The attributes can include whether to allocate memory pools based on topology alone, class alone, or based on class and topology. The attributes can be configured to allocate first based on class to select a memory pool and then based on topology for a particular portion of the selected memory pool. For example, allocations for an instance of a class A of a process executing on the multi-core processor 110*a* may be made from a memory pool A which includes local RAMs 104*a-b* while allocations for an instance of a class B of a process executing on the multi-core processor 110*c* may be made from a memory pool B which includes local RAMs 104*c-d*. The specific locations of memory used for allocations within the memory pools, by the generated code, can be based on topology of the NUMA system. For example, a thread executing multi-core processor 110*a* would have memory locations within local RAM 104*a* selected instead of memory locations within local RAM 104*b* because local RAM 104*a* is closer to multi-core processor 110*a*. As another example, a thread executing on core 111*a* would have memory locations within L1 cache 112*a* selected instead of memory locations within L1 cache 112*b* because of the proximity of L1 cache 112*a* to the core 111*a*.

At block 406, memory allocation code is generated based on the attributes. The code is generated in a form that the runtime executable will use to create data structures in a thread-specific way. The memory allocation code is generated based on the attributes and the runtime executable can make thread specific memory allocations and class specific memory pool allocations based on the attributes. The application runtime is configured by the compiler to allocate memory from specific thread relative memory pools that are in nearby memory locations (e.g., based on system topology). The generated code thus allocates memory pools that are topology-local, for each instance of a class for each thread.

In some embodiments, the compiler accesses one or more portions of a template. The template is used to generate a class at compile time based on the template and the code that was accessed. The use of templates allows the generation of code with a class-hierarchy-specific allocator. The compiler can generate code for performing the NUMA aware memory allocations on per-thread and per-class basis before a call of the "new" operator in the code will be executed.

The generated code can be configured to allocate memory pools based on topology alone, class alone, or based on class and topology, according to the determined attributes. The generated code can thus be configured to allocate first based on class to a selected memory pool and then based on topology to allocate a particular portion of the selected memory pool.

At block 408, compiled code is generated (e.g., by a compiler). The compiled code includes code generated based on the attributes and based on the source code accessed (e.g., function calls, etc.).

At block 410, the compiled code is output. The compiled code can be output to a data store and be an executable file.

Table 2 shows example C++ code for an exemplary class with thread specific allocations, as described herein.

TABLE 2

Exemplary portion of class for memory allocation

```
class customer {
    static string TableName="Cust_rec";
    int cust_ID;
    __thread static int mem_pool = near_mempool( );
};
```

The code of Table 2 includes a class called customer with a static string variable, a non-attributed int variable, and a _thread static variable. When an instance of the class customer is created with the "new" operator, a portion of memory will be allocated for each variable that does not have a static or thread attribute. For example, a portion of memory will be allocated for an integer called the cust_ID. Memory can also be allocated for the tablename string variable in a single global location for all occurrences of the customer class.

The _thread static int mem_pool variable allocates a respective portion of memory for each thread. In some embodiments, a thread identifier is assigned to each memory pool so that each thread for a respective class instance will have a respective memory pool. The compiler generated code can include an automatic initialization portion to initialize memory pools based on system topology so that the memory pools are allocated in a NUMA-aware manner. For example, the automatic initialization of a language runtime could be configured to initialize 4 or 8 threads on execution and allocate memory pools for each instance of each class for each thread. The automatic initializer can be called the first time an object is instantiated.

The near_mempool( ) function allocates a memory pool to the mem_pool variable based on system topology (e.g., for NUMA systems). The near_mempool( ) function may be called once per thread automatically by the compiler generated code. The runtime will detect whether the thread specific mem_pool variable has been allocated and initialized. In some embodiments, the near_mempool( ) function examines the system topology during execution and determines a portion of memory to allocate for the memory pool based on the system topology. A thread specific variable can be allocated for each instance of the class and each different derivation of the class when the template is parameterized with the derived class and not a parent class. The near_mempool( ) function can return an address or pointer of an allocated memory pool.

Figure 5:
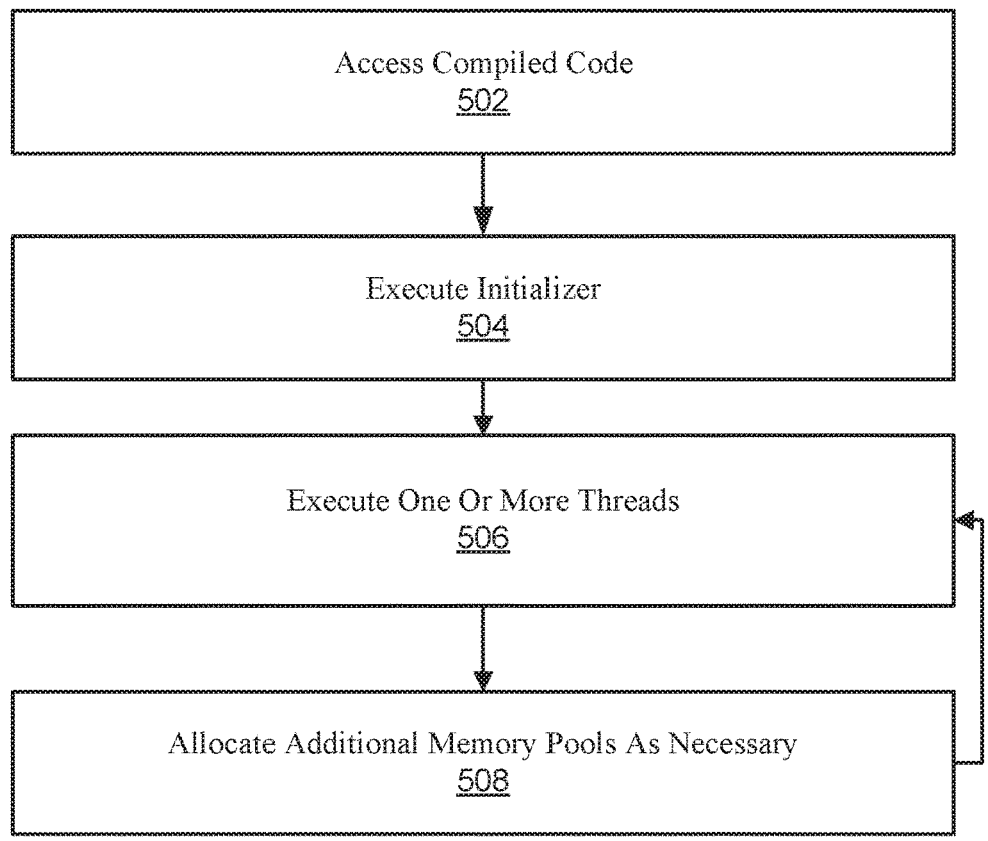
FIG. 5 shows a flowchart of an exemplary electronic component-controlled process for executing code and allocating memory, in accordance with various embodiments.

FIG. 5 shows a flowchart of an exemplary electronic component-controlled process for executing code and allocating memory, in accordance with various embodiments. FIG. 5 depicts a process 500 of executing compiled code that is configured for topology and class aware allocations on a per-class and per-thread basis. Process 5000 can perform allocation of memory based on the proximity of a core executing a thread and memory proximate to the core executing the thread. For example, portions of the local RAM 104*d* can be allocated for a thread executing on the core 141*d*.

At block 502, compiled code is accessed. The compiled code can be accessed from a data store (e.g., local storage) or received for execution (e.g., over from a network).

At block 504, an initializer is executed. The initializer can be part of a language runtime as described herein. The initializer can allocate thread and class specific memory pools as part of the initialization process for one or more threads, as described herein. The initializer can be configured to select a memory pool based on class and/or topology and then select an area with the selected memory pool for one or more memory allocations based on topology. The initializer may access data related to the classes and other objects of a process that is to be executed. For example, an initializer for a process with a class A to be executed on core 111*c* of multi-core processor 110*a* can select a memory pool A including local RAMs 104*a-b* for memory allocations to be associated with the class A of the process. The initializer can further select portions of local RAM 104*a* based on the proximity of the local RAM 104*a* to multi-core processor 110*a*.

At block 506, one or more threads are executed. The one or more threads can be executed after the allocations by the initializer, as described herein. The compiled code including functions calls and other computations can be executed as one or more threads.

At block 508, additional memory pools are allocated. The additional memory pools can be allocated as more threads of a process are generated or as threads request allocations of memory for new instances of classes. For example, an initializer for a process with a class A to be executed on core 111*c* of multi-core processor 110*a* can select a memory pool A including local RAMs 104*a-b* for memory allocations to be associated with the class A of the process. The initializer can further select portions of local RAM 104*a* based on the proximity of the local RAM 104*a* to the core 111*c*.

Figure 6:
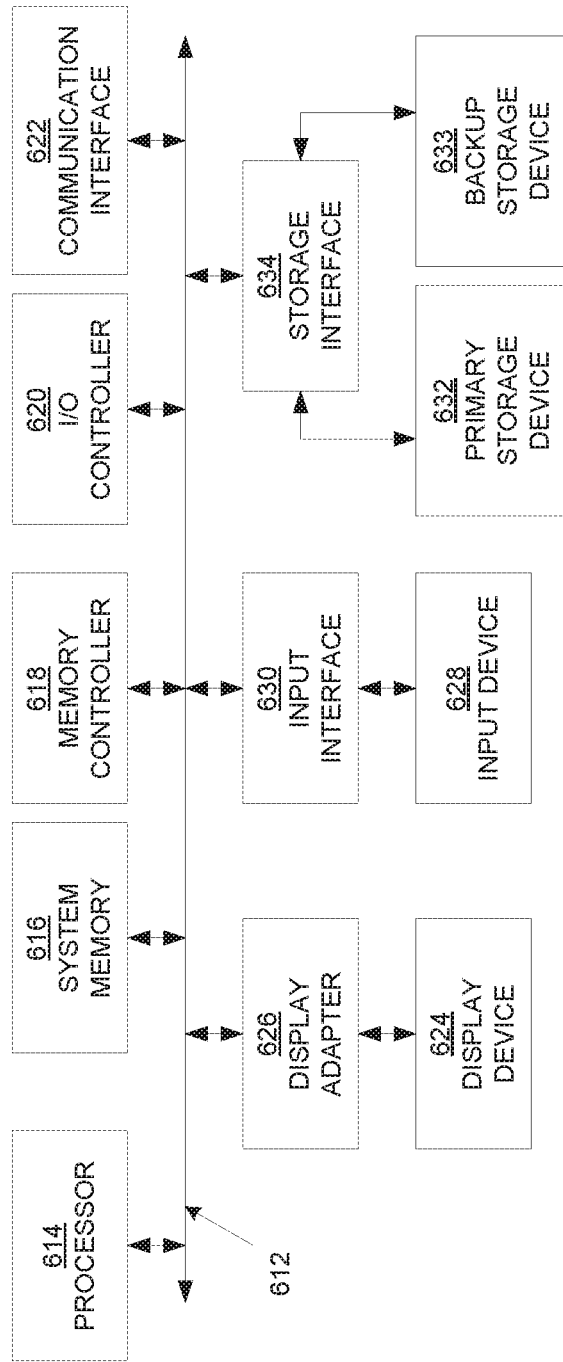
FIG. 6 is a block diagram of an exemplary computing system including various embodiments.

FIG. 6 is a block diagram of an exemplary computing system 600 including various embodiments. FIG. 6 depicts a computing system 600 for performing the functions, processes, etc., described herein. For example, the computing system 600 may compile code and/or execute code for allocating memory, as described herein. Computing system 600 broadly represents any single or multi-processor computing device or system capable of executing computer-readable instructions. Examples of computing system 600 include, without limitation, workstations, laptops, client-side terminals, servers, supercomputers, distributed computing systems, handheld devices, or any other computing system or device. In its most basic configuration, computing system 600 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the example embodiments described and/or illustrated herein. For example, processor 614 may perform and/or be a means for performing, either alone or in combination with other elements, one or more of the receiving, accessing, identifying, determining, using, associating, allocating, executing, initializing, compiling implementing, and providing described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, RAM, ROM, FLASH memory, or any other suitable memory device. Although not required, in certain embodiments computing system 600 may include both a volatile memory unit (such as, for example, system memory 616) and a non-volatile storage device (such as, for example, primary storage device 632. For example, the processor 614 can be the multi-core processor 110*a* and the system memory 616 can be the local RAM 104*a*. The local RAM 104*a* can store code compiled, as described with respect to FIG. 4. The local RAM 104*a* can further be used for used for class and topology based memory allocations, as described with respect to FIG. 5, for portions of compiled code executing on one or more of the cores 111*a-d* of the multi-core processor 110*a*.

Computing system 600 may also include one or more components or elements in addition to processor 614 and system memory 616. For example, in the embodiment of FIG. 6, computing system 600 includes a memory controller 618, an I/O controller 620, and a communication interface 622, each of which may be interconnected via a communication infrastructure 612.

Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network. In one embodiment, system memory 616 communicates via a dedicated memory bus.

Memory controller 618 generally represents any type or form of device capable of handling memory or data or controlling communication between one or more components of computing system 600. For example, memory controller 618 may control communication between processor 614, system memory 616, and I/O controller 620 via communication infrastructure 612. Memory controller may perform and/or be a means for performing, either alone or in combination with other elements, one or more of the operations or features described herein.

I/O controller 620 generally represents any type or form of module capable of coordinating and/or controlling the input and output functions of a computing device. For example, I/O controller 620 may control or facilitate transfer of data between one or more elements of computing system 600, such as processor 614, system memory 616, communication interface 622, display adapter 626, input interface 630, and storage interface 634. I/O controller 620 may be used, for example, to perform and/or be a means for performing, either alone or in combination with other elements, one or more of the operations described herein. I/O controller 620 may also be used to perform and/or be a means for performing other operations and features set forth in the instant disclosure.

Communication interface 622 broadly represents any type or form of communication device or adapter capable of facilitating communication between example computing system 600 and one or more additional devices. For example, communication interface 622 may facilitate communication between computing system 600 and a private or public network including additional computing systems. Examples of communication interface 622 include, without limitation, a wired network interface (such as a network interface card), a wireless network interface (such as a wireless network interface card), a modem, and any other suitable interface. In one embodiment, communication interface 622 provides a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

Communication interface 622 may also represent a host adapter configured to facilitate communication between computing system 600 and one or more additional network or storage devices via an external bus or communications channel. Examples of host adapters include, without limitation, SCSI host adapters, USB host adapters, IEEE (Institute of Electrical and Electronics Engineers) 694 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 622 may also allow computing system 600 to engage in distributed or remote computing. For example, communication interface 622 may receive instructions from a remote device or send instructions to a remote device for execution. Communication interface 622 may perform and/or be a means for performing, either alone or in combination with other elements, one or more of the operations disclosed herein. Communication interface 622 may also be used to perform and/or be a means for performing other operations and features set forth in the instant disclosure.

As illustrated in FIG. 6, computing system 600 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, computing system 600 may also include at least one input device 628 coupled to communication infrastructure 612 via an input interface 630. Input device 628 generally represents any type or form of input device capable of providing input, either computer- or human-generated, to computing system 600. Examples of input device 628 include, without limitation, a keyboard, a pointing device, a speech recognition device, or any other input device. In one embodiment, input device 628 may perform and/or be a means for performing, either alone or in combination with other elements, one or more of the operations disclosed herein. Input device 628 may also be used to perform and/or be a means for performing other operations and features set forth in the instant disclosure.

As illustrated in FIG. 6, computing system 600 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state disk, a floppy disk drive, a magnetic tape drive, an optical disk drive, a FLASH drive, or the like. Storage interface 634 generally represents any type or form of interface or device for transferring data between storage devices 632 and 633 and other components of computing system 600.

Continuing with reference to FIG. 6, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a FLASH memory device, or the like. Storage devices 632 and 633 may also include other similar structures or devices for allowing computer software, data, or other computer-readable instructions to be loaded into computing system 600. For example, storage devices 632 and 633 may be configured to read and write software, data, or other computer-readable information. Storage devices 632 and 633 may also be a part of computing system 600 or may be separate devices accessed through other interface systems.

Storage devices 632 and 633 may be used to perform, and/or be a means for performing, either alone or in combination with other elements, one or more of the operations disclosed herein. Storage devices 632 and 633 may also be used to perform, and/or be a means for performing, other operations and features set forth in the instant disclosure.

Many other devices or subsystems may be connected to computing system 600. Conversely, all of the components and devices illustrated in FIG. 6 need not be present to practice the embodiments described herein. The devices and subsystems referenced above may also be interconnected in different ways from that shown in FIG. 6. Computing system 600 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 600. All or a portion of the computer program stored on the computer-readable medium may then be stored in system memory 616 and/or various portions of storage devices 632 and 633. When executed by processor 614, a computer program loaded into computing system 600 may cause processor 614 to perform and/or be a means for performing the functions of the example embodiments described and/or illustrated herein. Additionally or alternatively, the example embodiments described and/or illustrated herein may be implemented in firmware and/or hardware. For example, computing system 600 may be configured as an ASIC adapted to implement one or more of the embodiments disclosed herein.

Figure 7:
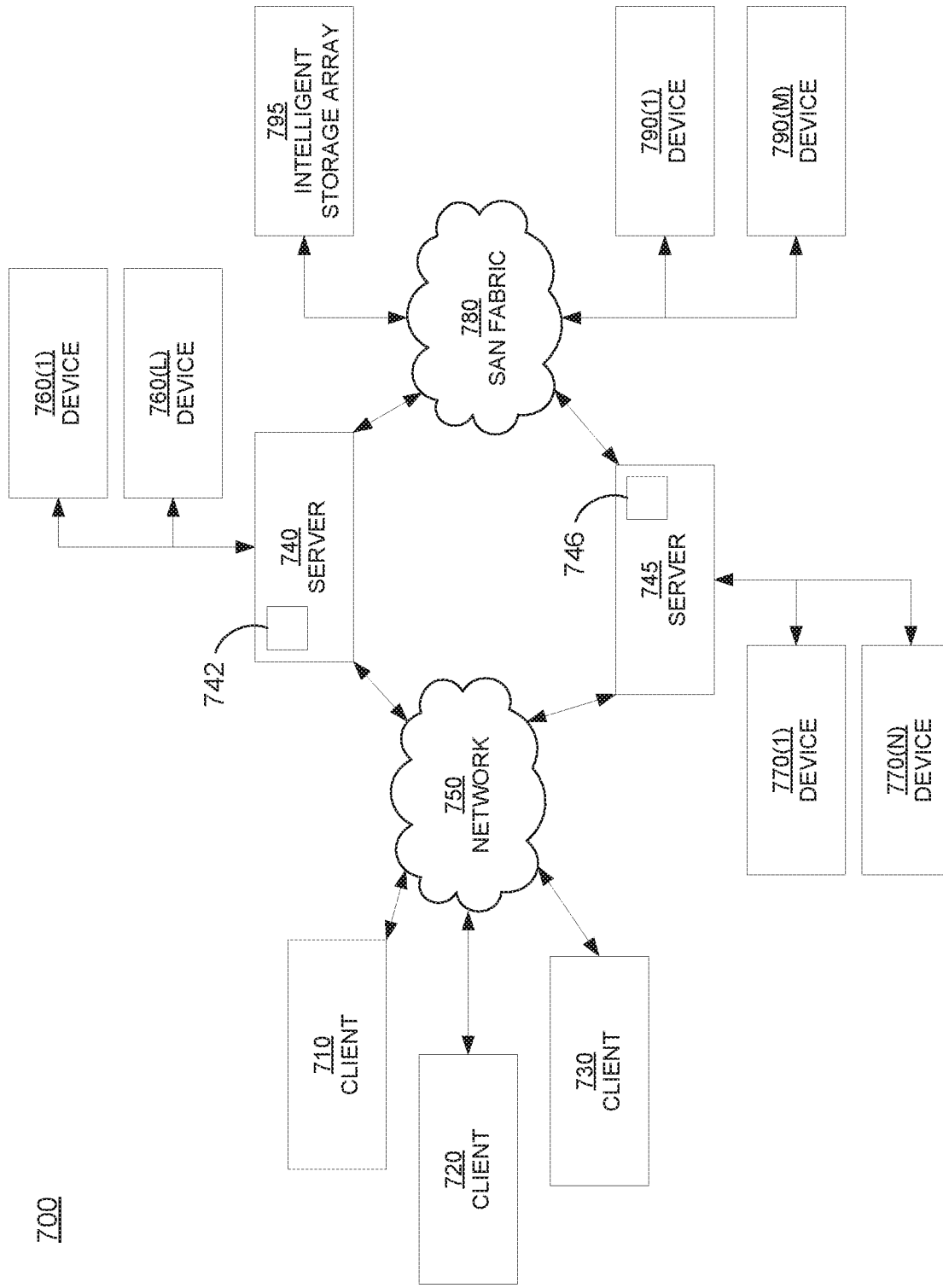
FIG. 7 is a block diagram of an exemplary operating environment, in accordance with various embodiments.

FIG. 7 is a block diagram of an exemplary operating environment 700 in which client systems 710, 720, and 730 and servers 740 and 745 may be coupled to a network 750. Client systems 710, 720, and 730 generally represent any type or form of computing device or system, such as computing system 600 of FIG. 6.

Similarly, servers 740 and 745 generally represent computing devices or systems, such as application servers or database servers, configured to provide various database services and/or run certain software applications. In some embodiments, the servers 740 may include and/or execute an executable 742 configured for compiling code or allocating memory, as described herein. In some embodiments, the servers 745 may include and/or execute an executable 746 configured for compiling code or allocating memory, as described herein. For example, one or more of the executables 742 and 746 can be a compiler for compiling code as described with respect to FIG. 4. As another example, one or more of the executables 742 and 746 can be a program compiled as described with respect to FIG. 4 and when executed allocate memory based on a class and/or topology basis as described with respect to FIG. 5. Network 750 generally represents any telecommunication or computer network including, for example, an intranet, a WAN, a LAN, a PAN, or the Internet.

As illustrated in FIG. 7, one or more storage devices 760(1)-(L) may be directly attached to server 740. Similarly, one or more storage devices 770(1)-(N) may be directly attached to server 745. Storage devices 760(1)-(L) and storage devices 770(1)-(N) generally represent any type or form of storage device or medium capable of storing data and/or other computer-readable instructions. Storage devices 760(1)-(L) and storage devices 770(1)-(N) may represent NAS devices configured to communicate with servers 740 and 745 using various protocols, such as NFS, SMB, or CIFS.

Servers 740 and 745 may also be connected to a SAN fabric 780. SAN fabric 780 generally represents any type or form of computer network or architecture capable of facilitating communication between storage devices. SAN fabric 780 may facilitate communication between servers 740 and 745 and storage devices 790(1)-(M) and/or an intelligent storage array 795. SAN fabric 780 may also facilitate, via network 750 and servers 740 and 745, communication between client systems 710, 720, and 730 and storage devices 790(1)-(M) and/or intelligent storage array 795 in such a manner that devices 790(1)-(M) and array 795 appear as locally attached devices to client systems 710, 720, and 730. As with storage devices 760(1)-(L) and storage devices 770(1)-(N), storage devices 790(1)-(M) and intelligent storage array 795 generally represent any type or form of storage device or medium capable of storing data and/or other computer-readable instructions.

With reference to computing system 600 of FIG. 6, a communication interface, such as communication interface 622, may be used to provide connectivity between each client system 710, 720, and 730 and network 750 of FIG. 7. Client systems 710, 720, and 730 may be able to access information on server 740 or 745 using, for example, a Web browser or other client software. Such software may allow client systems 710, 720, and 730 to access data hosted by server 740, server 745, storage devices 760(1)-(L), storage devices 770(1)-(N), storage devices 790(1)-(M), or intelligent storage array 795. Although FIG. 7 depicts the use of a network (such as the Internet) for exchanging data, the embodiments described herein are not limited to the Internet or any particular network-based environment.

The above described embodiments may be used, in whole or in part, in systems that process large amounts of data and/or have tight latency constraints, and, in particular, with systems using one or more of the following protocols and formats: Key-Value (KV) Store, Memcached, Redis, Neo4J (Graph), Fast Block Storage, Swap Device, and Network RAMDisk. In addition, the above described embodiments may be used, in whole or in part, in systems employing virtualization, Virtual Desktop Infrastructure (VDI), distributed storage and distributed processing (e.g., Apache Hadoop), data analytics cluster computing (e.g., Apache Spark), Infrastructure as a Service (IaaS), Platform as a Service (PaaS), and other cloud computing platforms (e.g., Vmware vCloud, Open Stack, and Microsoft Azure). Further, the above described embodiments may be used, in whole or in party, in systems conducting various types of computing, including Scale Out, Disaggregation, Multi-Thread/Distributed Processing, RackScale, Data Center Scale Computing, Elastic Memory Provisioning, Memory as a Service, page migration and caching and Application Offloading/Acceleration and Integration, using various types of storage, such as Non-Volatile Memory Express, Flash, Multi-Tenancy, Internet Small Computer System Interface (iSCSI), Object Storage, Scale Out storage, and using various types of networking, such as 10/40/100 GbE, Software-Defined Networking, Silicon Photonics, Rack TOR Networks, and Low-Latency networking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:
1. A method comprising:
    accessing code to be compiled, wherein the code comprises a plurality of instances of an allocation operator for memory allocation; and
    compiling the accessed code into a set of compiled instructions that are configured to:
        associate a first memory pool of a non-uniform memory architecture (NUMA) memory with a first instance of a class referenced by a first thread executing on a first processing element, wherein the first memory pool is associated with a first thread scoped variable unique to the first thread;
        associate a second memory pool of the NUMA memory with a second instance of the class referenced by a second thread executing on a second processing element, wherein the second memory pool is associated with a second thread scoped variable unique to the second thread, and wherein the first memory pool has a different memory architecture than the second memory pool;
        allocate memory from the first memory pool for instances of the allocation operator on a per object basis for one or more objects associated with the first instance of the class referenced by the first thread using the first thread scoped variable; and allocate memory from the second memory pool for instances of the allocation operator on a per object basis for one or more objects associated with the second instance of the class referenced by the second thread using the second thread scoped variable.

2. The method of claim 1, wherein the first processing element is a processor.

3. The method of claim 1, wherein the first processing element is a processor core.

4. The method of claim 1, wherein the first memory pool is allocated based on proximity of the first memory pool to the first processing element.

5. The method of claim 1, wherein the NUMA memory comprises a plurality of memory modules and the first and second processing elements are reconfigurable.

6. The method of claim 1, wherein the code is compatible with C++ code.

7. The method of claim 1, wherein the allocation operator is a modified new operator.

8. The method of claim 7, wherein the modified new operator is based on a template configured for overloading allocation.

9. The method of claim 1, wherein the allocation operator is a modified delete operator.

10. The method of claim 9, wherein the modified delete operator is based on a template configured for overloading allocation.

11. A non-transitory computer-readable storage medium comprising instructions stored thereon, the instructions configured to cause a computer system to:
execute, on a first processing element, compiled code corresponding to an operator enabling NUMA aware allocation of memory, the compiled code referencing a first instance of a class;
determine that an execution occurs on the first processing element and identify a first NUMA node as local to the first processing element, in response to execution of the compiled code corresponding to the operator enabling NUMA aware allocation of memory, wherein the first NUMA node is associated with a first variable unique to the first processing element;
initialize, on the first NUMA node, a first memory pool comprising one or more objects associated with the first instance of the class in response to the operator enabling the NUMA aware allocation of memory and using the first variable;
execute, on a second processing element, compiled code corresponding to the operator enabling NUMA aware allocation of memory, the compiled code referencing a second instance of a class;
determine that an execution occurs on the second processing element and identify a second NUMA node as local to the second processing element, in response to execution of the compiled code corresponding to the operator enabling NUMA aware allocation of memory, wherein the second NUMA node is associated with a second variable unique to the second processing element, and
initialize, on the second NUMA node, a second memory pool comprising one or more objects associated with the first instance of the class in response to the operator enabling the NUMA aware allocation of memory and using the second variable.

12. The non-transitory computer-readable storage medium of claim 11, wherein the plurality of NUMA nodes comprises a plurality of memory modules and the first and second processing elements are reconfigurable.

13. The non-transitory computer-readable storage medium of claim 11, wherein the compiled code is compiled C++ code.

14. The non-transitory computer-readable storage medium of claim 11, wherein the operator enabling NUMA aware allocation of memory is a modified new operator.

15. The non-transitory computer-readable storage medium of claim 14, wherein the modified new operator is based on a template configured for overloading allocation.

16. A method comprising:
receiving code to be compiled, the code comprising: a first class; a second class; and a plurality of instances of an operator for memory allocation with respect to at least one of the first class and the second class; and
compiling the received code into a set of compiled instructions configured to:
associate a first set of memory pools of a first non-uniform memory architecture (NUMA) memory with the first class, wherein the first set of memory pools is associated with a first variable;
associate a second set of memory pools of a second NUMA memory with the second class, wherein the second set of memory pools is associated with a second variable, and wherein the first memory pool has a different memory architecture than the second memory pool;
allocate memory from a memory pool within the first set of memory pools for instances of the operator for memory allocation with respect to one or more objects associated with the first class using the first variable; and
allocate memory from a memory pool within the second set of memory pools for instances of the operator for memory allocation with respect to one or more objects associated with the second class using the second variable.

17. The method of claim 16, wherein the first set of memory pools is within a respective processor's local cache while the second set of memory pools is within a respective processor's shared cache.

18. The method of claim 16, wherein the allocation of memory from the memory pool within the first set of memory pools is based on NUMA aware allocation comprising a determination of which part of the memory pool within the first set of memory pools to allocate.

19. The method of claim 18, wherein the first set of memory pools comprises a local cache and non local cache relative to a respective processor core.

20. The method of claim 16, wherein the code is C++ code.

21. The method of claim 16, wherein the operator enabling class aware allocation of memory is a modified new operator.

22. The method of claim 21, wherein the modified new operator is based on a template configured for overloading allocation.

23. A non-transitory computer-readable storage medium comprising instructions stored thereon, the instructions configured to cause a computer system to:
determine that a first plurality of non-uniform memory architecture (NUMA) nodes from within a first set of memory pools are to be used for memory allocations with respect to a first class and a second plurality of NUMA nodes from within a second set of memory pools are to be used for memory allocations with respect to a second class;

execute, on a processing element, compiled code corresponding to an operator enabling class aware allocation of memory, in response to execution of the compiled code corresponding to the operator enabling class aware allocation of memory, determine that the allocation occurs with respect to the first class and identify, using a first variable unique to a first thread executed by the processing element, a first memory pool from within the first set of memory pools to be used for memory allocation with respect to the first class;

initialize the NUMA node from with the first set of memory pools in response to the operator enabling class aware allocation of memory;

execute, on the processing element, compiled code corresponding to the operator enabling class aware allocation of memory;

in response to the execution of compiled code corresponding to the operator enabling class aware allocation of memory, determine that the allocation of the memory occurs with respect to the second class and identify, using a second variable unique to a second thread executed by the processing element, a second memory pool within the second set of memory pools to be used for memory allocation with respect to the second class; and initialize the NUMA node from within the second set of memory pools in response to the operator enabling class aware allocation of memory.

24. The non-transitory computer-readable storage medium of claim 23, wherein the first plurality of NUMA nodes comprises a plurality of memory modules and the processing element is reconfigurable.

25. The non-transitory computer-readable storage medium of claim 23, wherein the compiled code is compiled C++ code.

26. The non-transitory computer-readable storage medium of claim 23, wherein the operator enabling class aware allocation of memory is a modified new operator.

27. The non-transitory computer-readable storage medium of claim 26, wherein the modified new operator is based on a template configured for overloading allocation.

* * * * *